(12) United States Patent
Yu et al.

(10) Patent No.: US 11,450,477 B2
(45) Date of Patent: Sep. 20, 2022

(54) PHASE-SHIFT AUTOTRANSFORMER, MULTI-PULSE RECTIFIER SYSTEMS AND FAST CHARGING

(71) Applicant: KARMA AUTOMOTIVE LLC, Irvine, CA (US)

(72) Inventors: Xiaohang Yu, Irvine, CA (US); Lixin Tang, Irvine, CA (US); Geng Niu, Irvine, CA (US)

(73) Assignee: Karma Automotive LLC, Irvine, CA (US)

( * ) Notice: Subject to any disclaimer, the term of this patent is extended or adjusted under 35 U.S.C. 154(b) by 316 days.

(21) Appl. No.: 16/836,834

(22) Filed: Mar. 31, 2020

(65) Prior Publication Data
US 2021/0304958 A1 Sep. 30, 2021

(51) Int. Cl.
*H01F 27/29* (2006.01)
*H01F 30/02* (2006.01)
(Continued)

(52) U.S. Cl.
CPC .............. *H01F 30/02* (2013.01); *B60L 53/16* (2019.02); *B60L 53/30* (2019.02); *H01F 17/043* (2013.01);
(Continued)

(58) Field of Classification Search
CPC ...... B60L 53/30; B60L 2210/30; H01F 27/24; H01F 27/26; H01F 27/263; H01F 27/28;
(Continued)

(56) References Cited

U.S. PATENT DOCUMENTS 1,719,892 A * 7/1929 Kubler ................ H01F 30/12
363/154
5,206,539 A * 4/1993 Kammeter ........... H01F 27/385
336/5
(Continued)

FOREIGN PATENT DOCUMENTS

CN 201230213 Y 4/2009
EP 1 974 451 B1 10/2017
(Continued)

OTHER PUBLICATIONS

International Search Report and Written Opinion dated Jul. 22, 2021 issued in related International PCT Application No. PCT/US2021/024021; filed Mar. 25, 2021.

*Primary Examiner* — Levi Gannon
(74) *Attorney, Agent, or Firm* — Honigman LLP (57) ABSTRACT

The present disclosure relates to systems and configurations for phase-shift autotransformers and multi-pulse rectifiers. A phase-shift autotransformer includes a wiring configuration for first, second and third magnetic cores, the wiring configuration including primary input and phase-shift windings. The primary input windings are configured to provide a first and second primary input inductances, and phase-shift windings of the wiring configuration are configured to provide multiple inductances for each phase-shift winding. A multi-pulse rectifier is provided including a phase-shifting autotransformer, a diode bridge rectifier configuration coupled to output of the autotransformer and a filtering capacitor coupled to the diode bridge rectifier. Other embodiments are directed to use of the multi-use rectifier system with vehicle charging station, such as an Electric Vehicle Supply Equipment (EVSE).

16 Claims, 11 Drawing Sheets

(51) Int. Cl.
*H01F 30/12* (2006.01)
*H02M 1/42* (2007.01)
*H02M 7/04* (2006.01)
*H02M 7/219* (2006.01)
*H01F 17/04* (2006.01)
*H01F 27/26* (2006.01)
*B60L 53/30* (2019.01)
*B60L 53/16* (2019.01)
*H01F 27/30* (2006.01)

(52) U.S. Cl.
CPC ........... *H01F 27/263* (2013.01); *H01F 27/29* (2013.01); *H01F 27/306* (2013.01); *H01F 30/12* (2013.01); *H02M 1/4216* (2013.01); *H02M 1/4266* (2013.01); *H02M 7/04* (2013.01); *H02M 7/219* (2013.01); *B60L 2210/30* (2013.01)

(58) Field of Classification Search
CPC ........ H01F 27/29; H01F 27/306; H01F 27/34; H01F 27/38; H01F 27/385; H01F 30/02; H01F 30/04; H01F 30/12; H01F 30/14; H02M 1/42; H02M 1/4208; H02M 1/4216; H02M 1/4258; H02M 1/4266; H02M 7/02; H02M 7/04; H02M 7/043
See application file for complete search history.

(56) References Cited

U.S. PATENT DOCUMENTS

| | | | | |
|---|---|---|---|---|
| 5,331,303 | A | * | 7/1994 | Shiota ................. H01F 30/12 336/170 |
| 5,903,066 | A | * | 5/1999 | Enjeti ................ H02M 1/4216 363/39 |
| 6,335,872 | B1 | | 1/2002 | Zhou et al. |
| 2005/0035838 | A1 | | 2/2005 | Owen |
| 2010/0219923 | A1 | | 9/2010 | Johnson, Jr. |
| 2014/0240051 | A1 | * | 8/2014 | Buono ................. H03F 1/0211 330/297 |
| 2015/0349658 | A1 | * | 12/2015 | Nguyen ................. H02M 1/14 363/84 |
| 2016/0149510 | A1 | * | 5/2016 | Dahl ................. H02M 1/4216 363/64 |
| 2017/0250023 | A1 | * | 8/2017 | Valdivia-Guerrero ................. H02M 7/06 |
| 2020/0177094 | A1 | * | 6/2020 | Nielsen ................. H02M 7/06 |
| 2021/0273552 | A1 | * | 9/2021 | Tian ................. H02M 1/126 |

FOREIGN PATENT DOCUMENTS

| | | | | |
|---|---|---|---|---|
| WO | WO-2006011206 | A1 * | 2/2006 | .......... H02M 1/4266 |
| WO | 2007/080195 | A3 | 7/2007 | |

* cited by examiner

PHASE-SHIFT AUTOTRANSFORMER, MULTI-PULSE RECTIFIER SYSTEMS AND FAST CHARGING

BACKGROUND

The present disclosure is directed to a phase-shifting autotransformer and multi-pulse rectifier systems including utility interface applications for fast charging.

Many electrical applications require power conversion from a supply source. Although there are many high power rectifier systems for AC to DC conversion, there still exists a need for systems and configurations to provide improved efficiency and power quality. With high power applications, even small improvements in efficiency yields appreciable savings. In addition, power quality is needed that does not prevent a power grid or degrade waveform quality.

Figure 1:
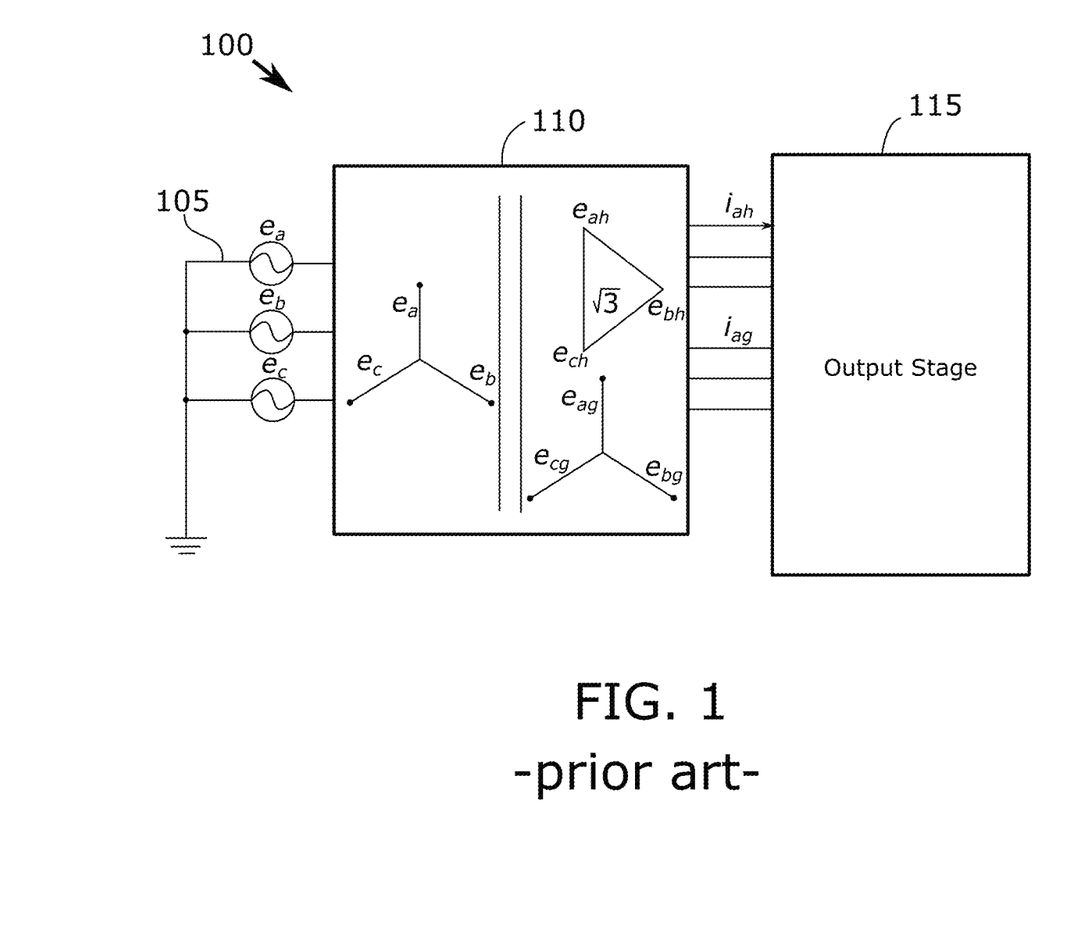
FIG. 1 depicts a conventional rectifier.

FIG. 1 shows a conventional configuration 100 with a star-delta phase shifting transformer 110 and output stage 115. Configuration 100 receives AC input 105 and converts supplied AC voltage with transformer 110 and output stage 115 in a 12-pulse rectifier configuration. Output stage 115 is configured to rectify output of transformer 110 and can often require the use of a special transformer as a controlled device to increase efficiency. Disadvantages of a 12-pulse rectifier are cost-due to the special transformer required—and physical footprint due to the components required.

In the conventional 12-pulse rectifier system with low-frequency isolation transformer shown in FIG. 1, the kVA capacity is 1.03 times output power. Due to the presence of reactive power, the total capacity of magnetic parts is actually larger than that of rectifier circuit. The volume and weight of the magnetic parts are dependent on the total kVA ratings of transformer and Harmonic Blocking Reactor (HBR). For the non-isolated multi-pulse rectifier system, even though kVA rating of autotransformer can be reduced to 18.2% of the output power, the additional HBR still results in a total required kVA rating of 20.8% of the output power. Besides, mess production for high power HBR is challenging and it is hard to control the inductance variation of HBR in practical usage.

There exists a need for harmonic reduction and power factor improvement capabilities including improvement of power efficiency and power quality.

SUMMARY

Disclosed and claimed herein are methods, devices and systems for phase-shift autotransformers and multi-pule rectification. In one embodiment, a phase-shift autotransformer includes a first magnetic core, a second magnetic core and a third magnetic core, and a wiring configuration for the first, second and third magnetic cores, wherein the wiring configuration includes primary input and phase-shift windings. The phase-shift autotransformer includes an input coupled to the wiring configuration, the input is configured to receive AC input. The phase-shift autotransformer includes an output coupled to the wiring configuration, the output configured to provide six-phase voltage output. The primary input windings of the wiring configuration and the first, second and third magnetic cores are configured to provide a first primary input inductance, a second primary input inductance, and a third primary input inductance. Phase-shift windings of the wiring configuration and the first, second and third magnetic cores are configured to provide a first and second inductance for phase-shift windings of the first magnetic core, a third and fourth inductance for phase-shift windings of the second magnetic core, and a fifth and sixth inductance for phase-shift windings of the third magnetic core.

In one embodiment, the first magnetic core, the second magnetic core and the third magnetic core include at least one of a five-column core and E-type core.

In one embodiment, output of the first primary inductance is coupled to the third and fourth inductance for phase-shift windings of the second magnetic core, output of the second primary inductance is coupled to the fifth and sixth inductance for phase-shift windings of the third magnetic core, and output of the third primary inductance is coupled to the first and second inductance for phase-shift windings of the first magnetic core.

In one embodiment, output of the first primary inductance is coupled between the third and fourth inductance for phase-shift windings of the second magnetic core, output of the second primary inductance is coupled between the fifth and sixth inductance for phase-shift windings of the third magnetic core, and output of the third primary inductance is coupled between the first and second inductance for phase-shift windings of the first magnetic core.

In one embodiment, phase angle of AC input voltage and current at each phase is shifted by the first primary input inductance, a second primary input inductance, and a third primary input inductance of the primary input windings of the wiring configuration.

In one embodiment, phase-shift windings of the wiring configuration and the first, second and third magnetic cores are configured to provide two voltage components for each core.

In one embodiment, the first magnetic core, the second magnetic core, the third magnetic core and the wiring configuration are configured to provide a capacity rating of about 10% of output power for a rectifier.

In one embodiment, the output of the autotransformer is configured to output six-phase output to a multi-pulse rectifier.

In one embodiment, the first magnetic core, a second magnetic core, third magnetic core and a wiring configuration are configured to provide a total kVA rating of about 9% output power.

According to another embodiment, a multi-pulse rectifier system is provided, the system including a phase-shift autotransformer, a diode bridge rectifier and filtering capacitor. In one embodiment, the phase-shift autotransformer includes a first magnetic core, a second magnetic core and a third magnetic core. The phase-shift autotransformer includes a wiring configuration for the first, second and third magnetic cores, wherein the wiring configuration includes primary input and phase-shift windings. The phase-shift autotransformer includes an input coupled to the wiring configuration, the input configured to receive AC input, and an output coupled to the wiring configuration, the output configured to provide six-phase voltage output. The primary input windings of the wiring configuration and the first, second and third magnetic cores are configured to provide a first primary input inductance, a second primary input inductance, and a third primary input inductance. The phase-shift windings of the wiring configuration and the first, second and third magnetic cores are configured to provide a first and second inductance for phase-shift windings of the first magnetic core, a third and fourth inductance for phase-shift windings of the second magnetic core, and a fifth and sixth inductance for phase-shift windings of the third magnetic core. The multi-pulse rectifier system includes a diode bridge rectifier configuration coupled to the output, and a filtering capacitor coupled to the diode bridge rectifier.

Another embodiment is directed to a charging station including a charging connection and a multi-pulse rectifier system coupled to the charging connection. The multi-pulse rectifier system including a phase-shift autotransformer. The phase-shift autotransformer includes a first magnetic core, a second magnetic core and a third magnetic core. The phase-shift autotransformer includes a wiring configuration for the first, second and third magnetic cores, wherein the wiring configuration includes primary input and phase-shift windings. The phase-shift autotransformer includes an input coupled to the wiring configuration, the input configured to receive AC input, and an output coupled to the wiring configuration, the output configured to provide six-phase voltage output. The primary input windings of the wiring configuration and the first, second and third magnetic cores are configured to provide a first primary input inductance, a second primary input inductance, and a third primary input inductance. The phase-shift windings of the wiring configuration and the first, second and third magnetic cores are configured to provide a first and second inductance for phase-shift windings of the first magnetic core, a third and fourth inductance for phase-shift windings of the second magnetic core, and a fifth and sixth inductance for phase-shift windings of the third magnetic core. The multi-pulse rectifier system includes a diode bridge rectifier configuration coupled to the output, and a filtering capacitor coupled to the diode bridge rectifier.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION

One aspect of the disclosure is directed to improved configurations and structures for phase-shifting autotransformers and multi-pulse rectifiers. Embodiments described herein are configured for reduction of harmonics and improvement of power factor.

In one embodiment, a phase-shift autotransformer structure is provided with a winding structure that achieves very low required power capacity. The phase-shift autotransformer structure includes a first magnetic core, a second magnetic core and a third magnetic core and a wiring configuration for the magnetic cores. The wiring configuration may include primary input and phase-shift windings. According to one embodiment, wherein primary input windings of the wiring configuration and the first, second and third magnetic cores are configured to provide a first primary input inductance, a second primary input inductance, and a third primary input inductance. Phase-shift windings of the wiring configuration and the first, second and third magnetic cores are configured to provide a first and second inductance for phase-shift windings of the first magnetic core, a third and fourth inductance for phase-shift windings of the second magnetic core, and a fifth and sixth inductance for phase-shift windings of the third magnetic core. According to one embodiment, the phase-shift autotransformer, by way of its winding and core structure may be configured to provide a phase shifting reactor/transformer configuration associated with a wiring circuit. The phase-shift autotransformer has a total capacity, due to its magnetic parts, that is actually larger than that of the rectifier circuit. The phase-shift autotransformer may be configured as a three-phase multi-phase rectifier. In certain embodiments, configurations are described that achieve a total kVA rating of only 9.38% of output power. For example, a 100 kilowatt (kW) transformer can be designed that only requires 9 kW of output power.

According to another embodiment, the phase-shift autotransformer includes an input and an output. The input is coupled to the wiring configuration and the input is configured to receive AC input, such as an AC supply. The is coupled to the wiring configuration and configured to provide six-phase voltage output, According to another embodiment, a multi-pulse rectifier system. In one embodiment, the multi-pulse rectifier system includes a phase-shift autotransformer, a diode bridge rectifier and filtering capacitor. The phase shifting reactor/transformer which provides line-frequency galvanic isolation in Electric Vehicle Supply Equipment (EVSE) plays an essential role in assuring system stability and generating less harmonics that are detrimental to grid. According to one embodiment, the proposed phase-shifting autotransformer is based on three-phase multi-pulse rectifier with passive power factor correction circuit for high power, rural-area DC charging application. Phase-shifting autotransformer configurations described herein can achieve a total kVA rating of 9.38% of output power, which greatly reduces the volume and weight, and increases the manufacturability of autotransformer in the rectifier system in EVSE Another embodiment is directed to charging stations and charging station configurations for electronic vehicles. In on embodiment, a charging station configuration sis provided that can include a charging connection, and a multi-pulse rectifier system coupled to the charging connection. The multi-pulse rectifier system including a phase-shift autotransformer. According to one embodiment, the charging station is configured to provide DC fast charging for electric vehicles, such as 200+kW power conversion from a grid source to.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination.

Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Figure 2:
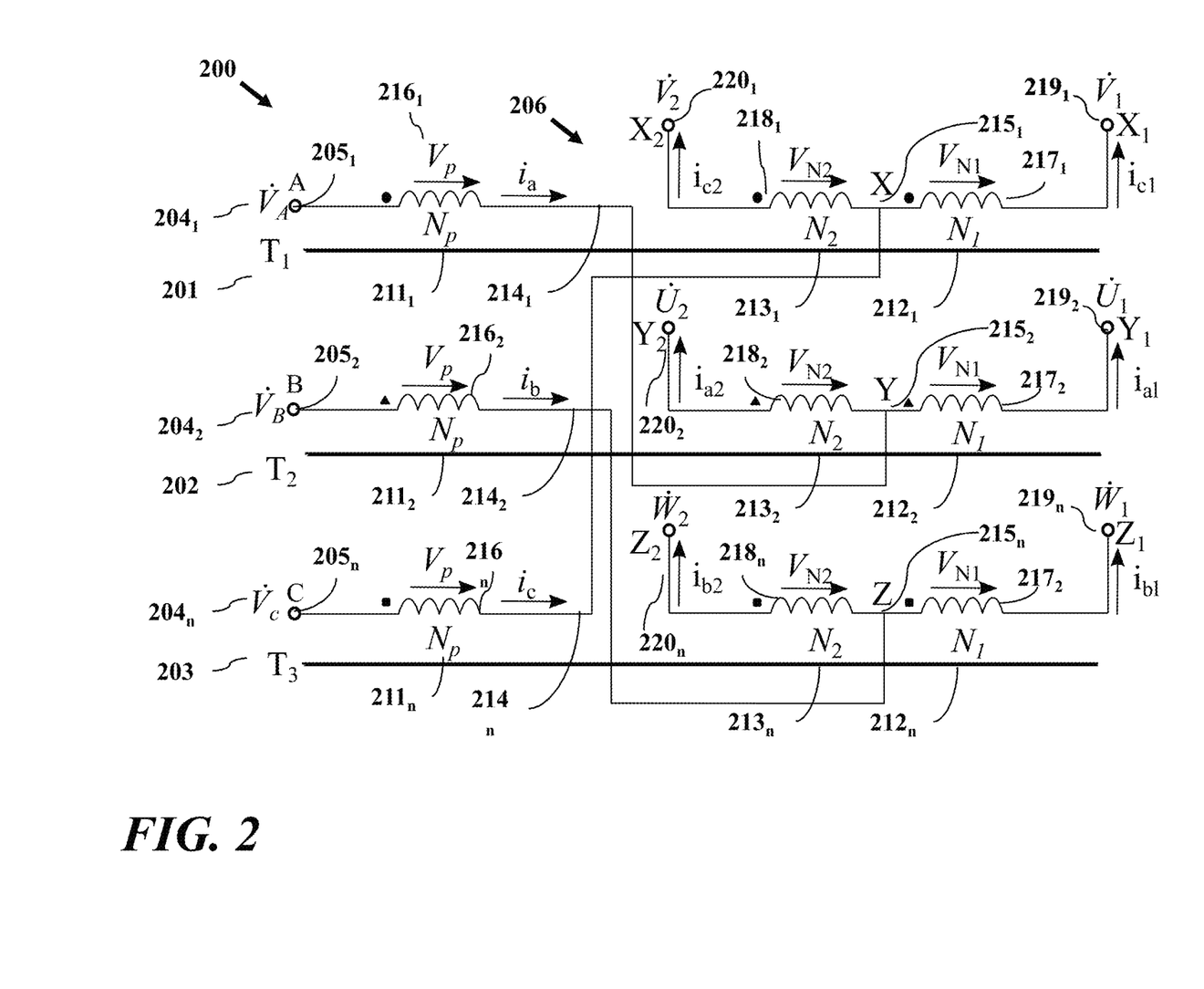
FIG. 2 depicts a graphical representation of a phase-shift autotransformer according to one or more embodiments.

Referring now to the figures, FIG. 2 depicts a graphical representation of a phase-shift autotransformer according to one or more embodiments. A wiring diagram is shown of phase-shift autotransformer 200 according to one or more embodiments. According to one embodiment, phase-shift autotransformer 200 includes a first magnetic core 201 ($T_1$), a second magnetic core 202 ($T_2$), and a third magnetic core 203 ($T_3$) and a wiring configuration 206 for the cores. Magnetic cores 201, 202, 203 may be three laminated cores. In one embodiment, magnetic cores 201, 202, 203 (e.g., a first magnetic core, a second magnetic core and a third magnetic core) include at least one of a five-column core and E-type core. In one embodiment, magnetic cores 201, 202, 203 and wiring configuration 206 are configured to provide a capacity rating of about 10% of output power for a rectifier. According to another embodiment, magnetic cores 201, 202, 203 and wiring configuration 206 are configured to provide a total kVA rating of about 9% output power.

Figure 4A:
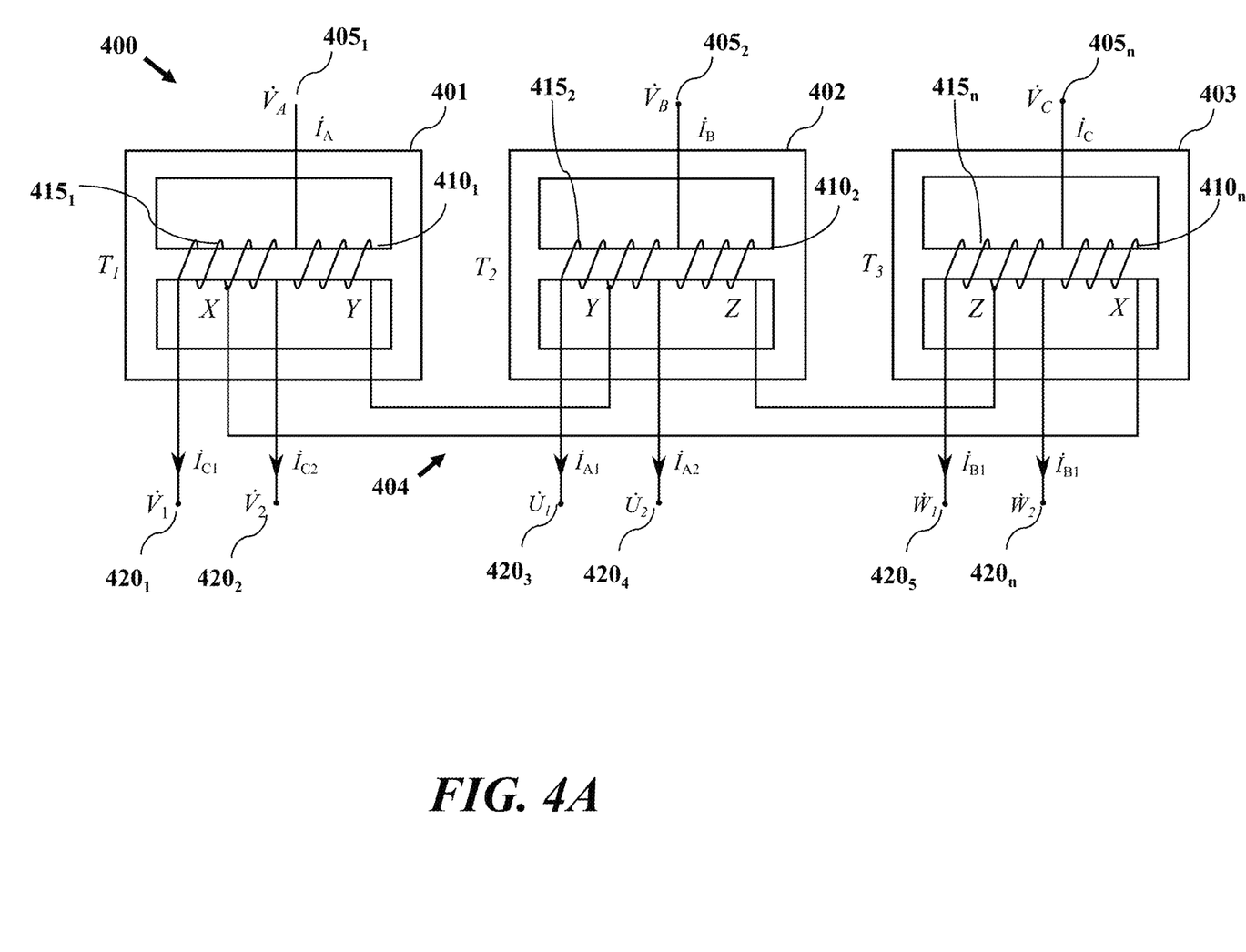
FIGS. 4A-4B depict a graphical representations of wiring configurations for a phase-shift autotransformer according to one or more embodiments.
Figure 4B:
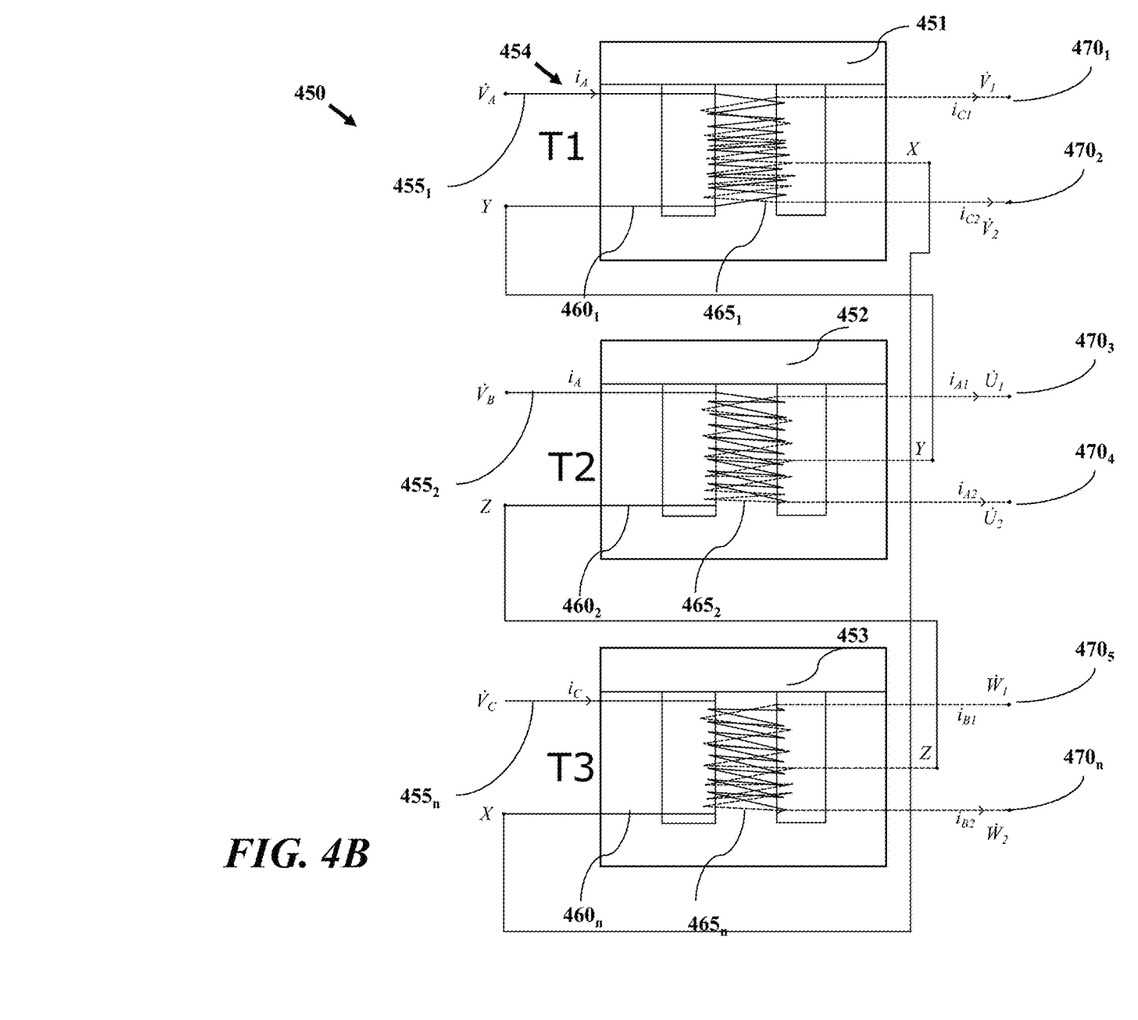

The wiring configuration 206 of phase-shift autotransformer 200 includes primary input windings ($N_p$) and phase-shift windings ($N_1$, $N_2$). A graphical representation of the wiring with respect to the three cores is shown in FIGS. 4A-4B, according to one or more embodiments.

Phase-shift autotransformer 200 includes an input $205_{1-n}$ coupled to the wiring configuration, the input is configured to receive AC input $204_{1-n}$ (also labeled $V_A$, $V_B$, $V_C$). In certain embodiments, phase-shift autotransformer 200 receives three-phase AC input ports from grid power. According to one embodiment, phase-shift autotransformer 200 includes an outputs $219_{1-n}$ and $220_{1-n}$ coupled to the wiring configuration, the output configured to provide six-phase voltage output. Outputs $219_{1-n}$ and $220_{1-n}$ (also labeled $X_1$, $X_2$, $Y_1$, $Y_2$, $Z_1$, $Z_2$) are output terminals of phase-shift autotransformer 200. In one embodiment, the outputs $219_{1-n}$ and $220_{1-n}$ are configured to output six-phase output to a multi-pulse rectifier.

The primary input windings $211_{1-n}$ (also labeled $N_P$) of the wiring configuration 206 and the first, second and third magnetic cores 201, 202, 203 are configured to provide a first primary input inductance $216_1$, a second primary input inductance $216_2$, and a third primary input inductance $216_n$. Phase-shift windings $212_{1-n}$ and $213_{1-n}$ (also labeled $N_1$, $N_2$) of the wiring configuration 206 and the first, second and third magnetic cores 201, 202, 203 are configured to provide a first and second inductance $217_1$ and $218_1$ for phase-shift windings $212_1$ and $213_1$ of the first magnetic core 201, a third and fourth inductance $217_2$ and $218_2$ for phase-shift windings $212_2$ and $213_2$ of the second magnetic core 202, and a fifth and sixth inductance $217_n$ and $218_n$ for phase-shift windings $212_n$ and $213_n$ of the third magnetic core 203. According to one embodiment, phase angle of AC input voltage and current at each phase of the autotransformer is shifted by the first primary input inductance, a second primary input inductance, and a third primary input inductance of the primary input windings of the wiring configuration.

As shown in FIG. 2, output $214_1$ of the first primary input winding $211_1$ is fed to terminal winding $215_2$ to be provided to third and fourth inductance $217_2$ and $218_2$ for phase-shift windings $212_2$ and $213_2$ of the second magnetic core 202. Output $214_2$ of the second primary input winding $211_2$ is fed to terminal winding $215_n$ to be provided to fifth and sixth inductance $217_n$ and $218_n$ for phase-shift windings $212_n$ and $213_n$ of the third magnetic core 203. Output $214_3$ of the third primary input winding $211_n$ is fed to terminal winding $215_1$ to be provided to first and second inductance $217_1$ and $218_1$ for phase-shift windings $212_1$ and $213_1$ of the first magnetic core 201. Accordingly, phase-shift windings of the wiring configuration and the first, second and third magnetic cores are configured to provide two voltage components for each core.

In certain embodiments, output of the first primary inductance associated with the first primary input winding $211_1$ is coupled to third and fourth inductances $217_2$ and $218_2$ for phase-shift windings $212_2$ and $213_2$ of the second magnetic core 202, output of the second primary inductance is coupled to the a fifth and sixth inductance $217_n$ and $218_n$ for phase-shift windings $212_n$ and $213_n$ of the third magnetic core 203, and output of the third primary inductance is coupled to the a first and second inductance $217_1$ and $218_1$ for phase-shift windings $212_1$ and $213_1$ of the first magnetic core 203. According to another embodiment, output of the first primary inductance associated with the first primary input winding $211_1$ is coupled between third and fourth inductances $217_2$ and $218_2$ for phase-shift windings $212_2$ and $213_2$ of the second magnetic core 202, output of the second primary inductance is coupled between the a fifth and sixth inductance $217_n$ and $218_n$ for phase-shift windings $212_n$ and $213_n$ of the third magnetic core 203, and output of the third primary inductance is coupled between the a first and second inductance $217_1$ and $218_1$ for phase-shift windings $212_1$ and $213_1$ of the first magnetic core 203e.

Taking phase A as an example, the phase of current and voltage in phase A is shifted by primary winding Np first, then shifted again by phase shift windings $N_1$ and $N_2$ windings in the magnetic core (e.g., magnetic core 201 ($T_1$)). Similar processes can be found in phase B and C (e.g., magnetic core 202 ($T_2$), and magnetic core 203 ($T_3$)). Therefore, the output from the proposed autotransformer contains six phase voltages and currents which will be fed to two three-phase full-bridge rectifiers. FIGS. 4A-4B illustrate structures of autotransformers using E-type core according to one or more embodiments.

Figure 3:
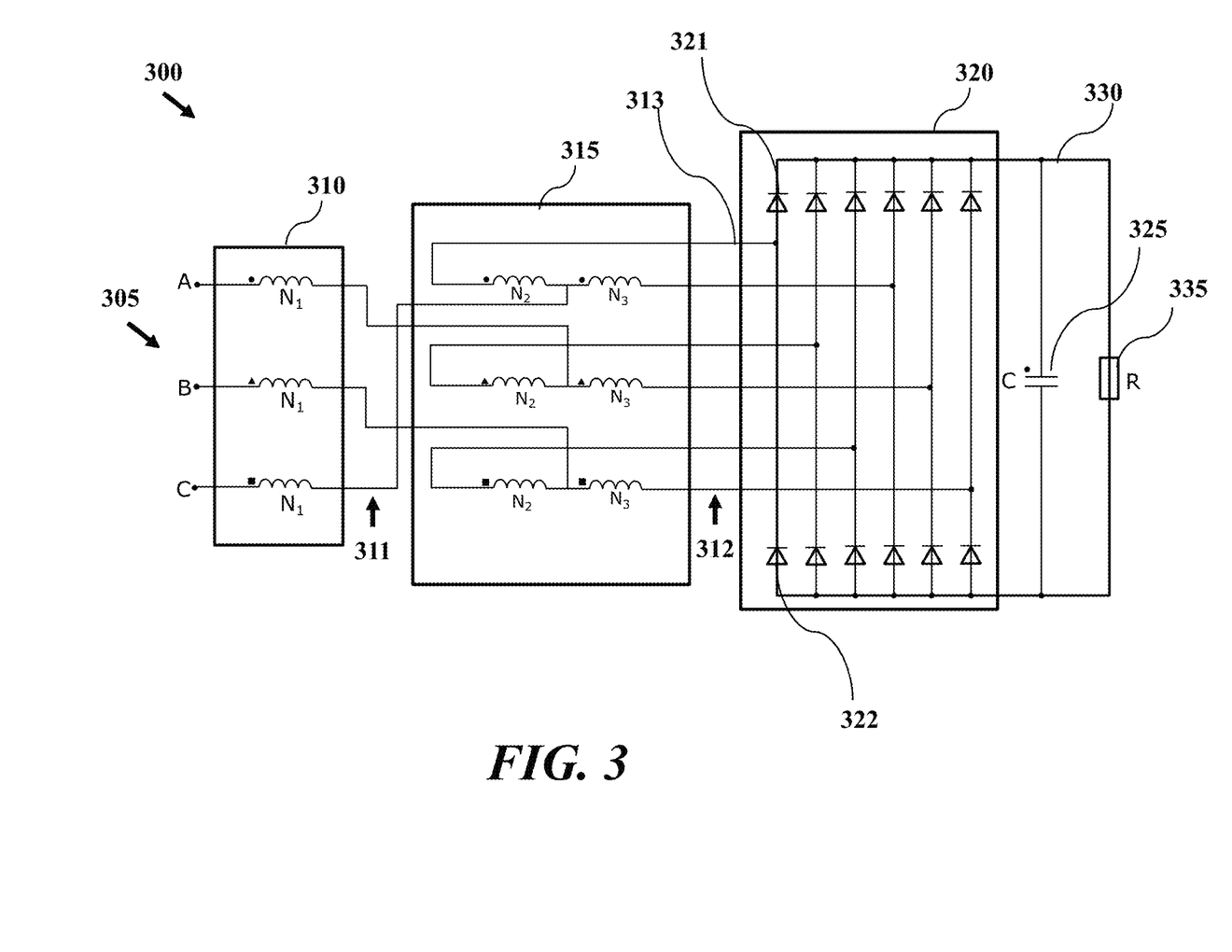
FIG. 3 depicts a graphical representation of a phase-shift autotransformer in a multi-pulse rectifier system according to one or more embodiments

Referring now to FIG. 3, a graphical representation of a phase-shift autotransformer in a multi-pulse rectifier system is shown according to one or more embodiment. In one embodiment, multi-pulse rectifier system 300 is configured to provide an efficient transformer and rectifier with desired power quality. In certain embodiments, system 300 may be incorporated in a charging station for electrical vehicle charging.

Multi-pulse rectifier system 300 includes a phase-shift autotransformer 305, a diode bridge rectifier 320 and filtering capacitor 325. Multi-pulse rectifier system 300 may be configured to include output 330 for providing power to a load, such as load 335. Unlike tradition controlled rectification bridges, diode bridge rectifier can be an uncontrolled diode bridge configuration include a pair of diodes for each output phase. According to one embodiment, phase-shift autotransformer 305 can include primary input windings 310 (also labeled $N_1$) and phase-shift windings 315 (also labeled $N_2$, $N_3$). Similar to the phase-shift autotransformer of FIG. 2, primary input windings 310 are configured to provide a first, second and third primary input inductances, wherein each primary input inductance is respective to the three-phase inputs (shown as A, B, C) and phase-shift windings 315 of the wiring configuration provide a first and second inductance, a third and fourth inductance, and a fifth and sixth inductance. Primary input windings 310 of phase-shift autotransformer 305 are configured to receive AC supply voltage, such as power grid supply voltage. Outputs, shown as 311 of the primary input windings 310 are fed to phase-shift windings 315 which includes 6-phase output 312.

According to one embodiment, each output of 6-phase output 312 feeds diode bridge rectifier 320. According to one embodiment, diode bridge rectifier 320 includes a diode pair for each of the 6-phase outputs of the phase-shift autotransformer 305. By way of example, output 313 of the 6-phase output 312 is coupled between diode 321 and 322 of diode bridge rectifier 320. Each diode pair, such as diodes 321 and 322 of diode bridge rectifier 320, rectifiers output of phase-shift autotransformer 305 which then feeds filtering capacitor 325. According to one embodiment, diode bridge rectifier 320 includes two six-pulse bridge circuits connected in series, with their AC connections fed from a supply transformer that produces a 30° phase shift between the two bridges. This cancels many of the characteristic harmonics the six-pulse bridges produce. Diode bridge rectifier 320 includes two 6-pulse rectifiers in parallel (12 diodes) to feed a common DC bus. Filtering capacitor 325 is coupled to output 300. Output 330 may a DC output to a load, such as load 335.

Multi-pulse rectifier system 300 provides a phase-shift autotransformer 305 before diode bridge rectifier 320 to provide current and voltage waveforms of desired quality. Configurations discussed herein allow for reduction in the weight and the size and of the phase shifting transformer. Configurations described herein can also eliminate the use of a transformer pairs, such as a star or delta transformer that are conventionally used in pairs. Embodiments described herein improve upon power solutions. By way of example, the auto transformers described herein can include windings coupled with each one and another to provide a new class of transformer structures.

FIGS. 4A-4B depict a graphical representations of wiring configurations for a phase-shift autotransformer according to one or more embodiments.

In FIG. 4A, an exemplary winding representation of a phase-shift auto-transformer 400 is shown according to one or more embodiments. According to one embodiment, the winding diagram in FIG. 4A may relate to the phase-shift auto-transformers of FIGS. 2 and 3. According to one embodiment, phase-shift auto-transformer 400 first magnetic core 401 ($T_1$), a second magnetic core 402 ($T_2$), and a third magnetic core 403 ($T_3$) and a wiring configuration 404 for the cores. Magnetic cores 401, 402, 403 may be laminated cores. According to another embodiment, wiring configuration 404 of phase-shift autotransformer 400 includes primary input windings $410_{1-n}$ and phase-shift windings $415_{1-n}$.

Phase-shift autotransformer 400 includes inputs $405_{1-n}$ coupled to the wiring configuration 404, the input is configured to receive AC input. According to one embodiment, phase-shift autotransformer 400 includes an outputs $420_{1-n}$. Outputs $420_{1-n}$ (also labeled $V_1$, $V_2$, $U_1$, $U_2$, $W_1$, $W_2$) may be output terminals of phase-shift autotransformer 400. Outputs $420_{1-n}$ provide six-phase output power.

In FIG. 4A, shows an exemplary winding representation of a phase-shift auto-transformer 450 according to one or more embodiments. According to one embodiment, the winding diagram in FIG. 4B may relate to the phase-shift auto-transformers of FIGS. 2 and 3. According to one embodiment, phase-shift auto-transformer 450 first magnetic core 451 ($T_1$), a second magnetic core 452 ($T_2$), and a third magnetic core 453 ($T_3$) and a wiring configuration 454 for the cores. Magnetic cores 451, 452, 453 may be laminated cores. According to another embodiment, wiring configuration 454 of phase-shift autotransformer 450 includes primary input windings $460_{1-n}$ and phase-shift windings $465_{1-n}$. In FIG. 4B, the primary winding Np is represented by solid line and dotted line stands for the secondary windings N1 and N2.

Phase-shift autotransformer 450 includes inputs $455_{1-n}$ coupled to the wiring configuration 454, the input is configured to receive AC input. According to one embodiment, phase-shift autotransformer 450 includes an outputs $470_{1-n}$. Outputs $420_{1-n}$ (also labeled $r_1$, $r_2$, $u_1$, $u_2$, $v_1$, $v_2$) may be output terminals of phase-shift autotransformer 450. Outputs $470_{1-n}$ provide six-phase output power.

Referring back to FIG. 4A, and similarly applying to FIG. 4B, currents $i_A$, $i_B$, $i_C$ are primary side currents associated with input $405_{1-n}$. $i_{A1}$, $i_{A2}$, while currents $i_{B1}$, $i_{B2}$, $i_{C1}$, $i_{C2}$ are secondary side current associated with outputs $420_{1-n}$. As the three-phase structure of proposed autotransformer is symmetrical, the phase shift in each phase is the same, such that:

$$I_{A1}=I_{A2}=I_{B1}=I_{B2}=I_{C1}=I_{C2}$$

Figure 5:
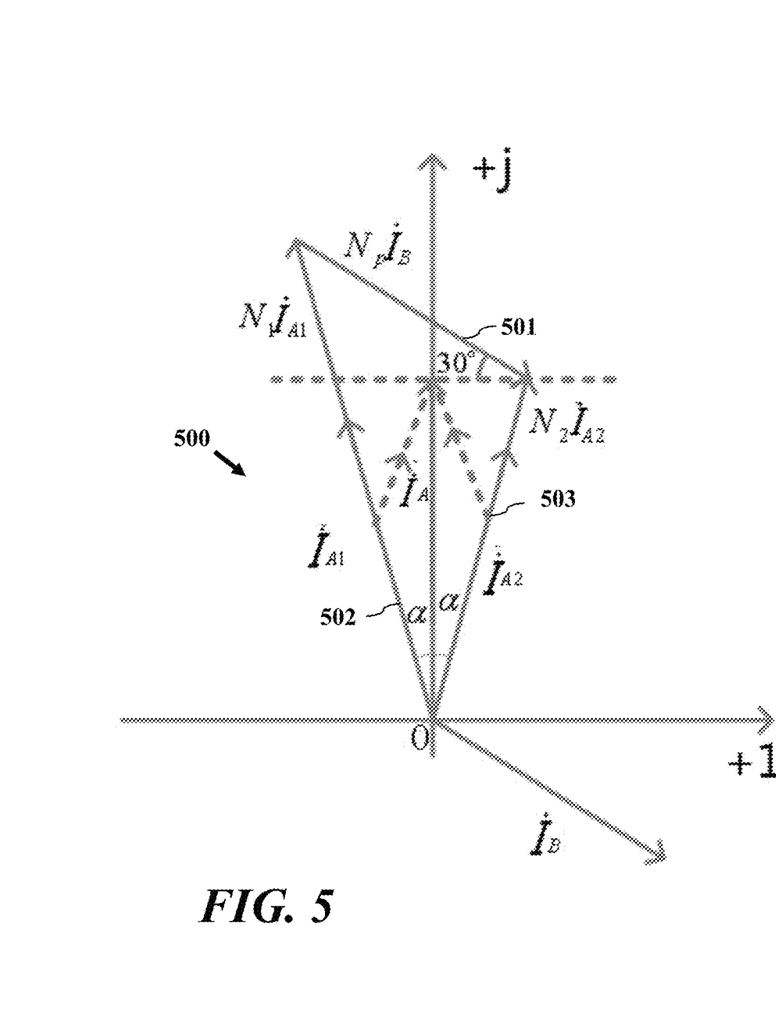
FIG. 5 depicts a current phasor diagram according to one or more embodiments.

According to Kirchoff's law and magnetic flux balance, the current vector is shown in FIG. 5. The angle between $i_{A1}$, $i_{A1}$, $i_{A2}$ is $\alpha$ which is the phase shift angle as well. The turn ratio can be calculated as $$N_P:N_1:N_2 = 2 \tan \alpha : (\sqrt{3}+\tan \alpha):(\sqrt{3}-\tan \alpha)$$

FIG. 5 depicts a current phasor diagram 500 according to one or more embodiments.

The current phasor diagram 500 includes phase current for the primary winding 501, phase current for a first phase shift winding 502 and phase current for a first phase shift winding 503. In FIG. 5, the phase shift angle $\alpha$ can be determined based on the selected harmonics which are going to be eliminated. For example, $I_o$ as output current can be expressed as:

$$|I_{q1}| = |I_{q2}| = \frac{I_0}{2}$$

Take phase A as an example, the phase current can be expressed as $$I_A = \frac{2}{\pi} I_0 \left( \sin\omega t \cos\alpha - \frac{1}{5}\sin(5\omega t)\cos(5\alpha) - \frac{1}{7}\sin(7\omega t)\cos(7\alpha) + \frac{1}{11}\sin(11\omega t)\cos(11\alpha) + \frac{1}{13}\sin(13\omega t)\cos(13\alpha) - \ldots \right)$$

Therefore, phase shift angle $\alpha$ can be chosen such that selected harmonics can be eliminated according to one or more embodiments. For instance, when $\alpha=\pi/10$, $\sin(5\omega t)*\cos(5\omega t)=0$. From analysis, when $\alpha=\pi/12$, the total harmonics is minimum.

$$THD = \sqrt{\frac{\left(\frac{1}{5}\cos\frac{5\pi}{12}\right)^2 + \left(\frac{1}{7}\cos\frac{7\pi}{12}\right)^2 + \left(\frac{1}{11}\cos\frac{11\pi}{12}\right)^2 + \left(\frac{1}{13}\cos\frac{13\pi}{12}\right)^2 + \ldots}{\left(\cos\frac{\pi}{12}\right)^2}} =$$

16.26%

The phase current can be calculated as $$I_A = \frac{2}{\pi}I_0\sqrt{\left(\cos\frac{\pi}{12}\right)^2 + \left(\frac{1}{5}\cos\frac{5\pi}{12}\right)^2 + \left(\frac{1}{7}\cos\frac{7\pi}{12}\right)^2 + \left(\frac{1}{11}\cos\frac{11\pi}{12}\right)^2 + \ldots} =$$

$0.662 I_0$

From FIG. 5, the relationships between secondary phase currents with respect to $I_o$ can be obtained as $$I_{A1} = I_{A2} = \frac{I_A}{2\cos\alpha} = I_{B1} = I_{B2} = \frac{I_B}{2\cos\alpha} = I_{C1} = I_{C2} = \frac{I_C}{2\cos\alpha}$$

$$I_A = I_B = I_C = 0.622 I_0$$

$I_{A1}=I_{A2}=I_{B1}=I_{B2}=I_{C1}=I_{C2}=0.301 I_0$

Figure 6:
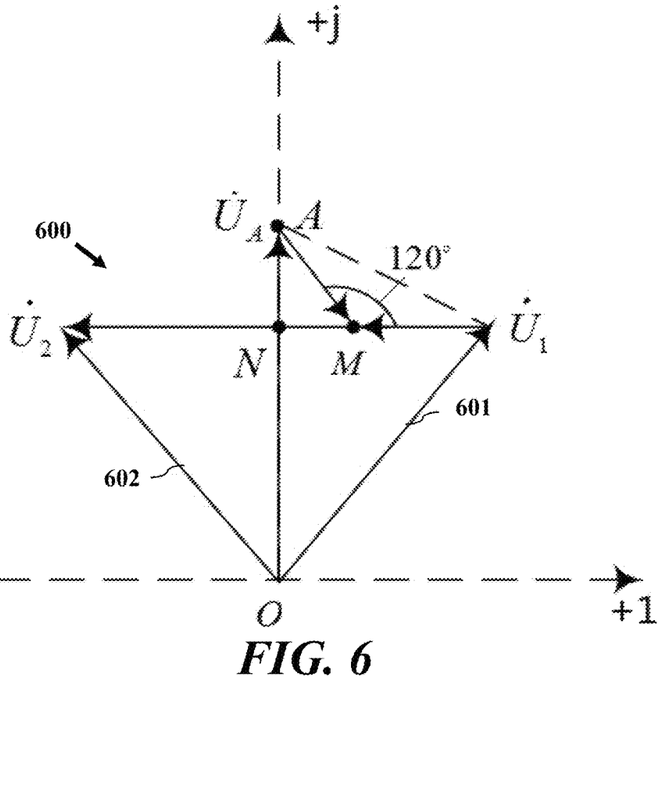
FIG. 6 depicts a voltage vector diagram according to one or more embodiments.

According to the definition of the capacity of transformer and the configuration of autotransformer, the total capacity is expressed as $P_{KVA,T}=3/2(I_A V_{Np}+I_{A1}V_{N1}+I_{A2}V_{N2})$ FIG. 6 depicts a voltage vector diagram according to one or more embodiments. The voltage vector diagram 600 includes vector voltage for a core of a transformer include output voltage 601 (e.g. output voltage 420₃, output voltage $U_1$), and output voltage 603 (e.g. output voltage 420₃, output voltage $U_1$).

Replacing phase A current components by $I_o$, and the relationship among voltage vectors from FIG. 6 can be expressed as:

$P_{KVA,T}=3.851 I_0 V_{Np}$,

The voltage vector of core T1 of autotransformer can be obtained from FIG. 6 as follows:

$$V_{N_p} = V_{AM} = \left(U_A - U_1\cos\frac{\pi}{12}\right)/\sin\frac{\pi}{6}$$

Thus, the total capacity is $P_{KVA,T}=0.152 I_0 V_{Np}$

Based on voltage vector diagram in FIG. 6, the output voltage can be expressed as $$U_o = \sqrt{1 + \frac{3}{\pi}}\; U_2 = \sqrt{1+\frac{3}{\pi}} \cdot \frac{1.6406}{\sqrt{2}}\; V_A = 1.621 V_A$$

Finally, the total capacity of proposed autotransformer can be calculated as $$P_{KVA,T} = \frac{0.152}{1.621}I_0 V_0 = 9.38\% P_0$$

Figure 7A:
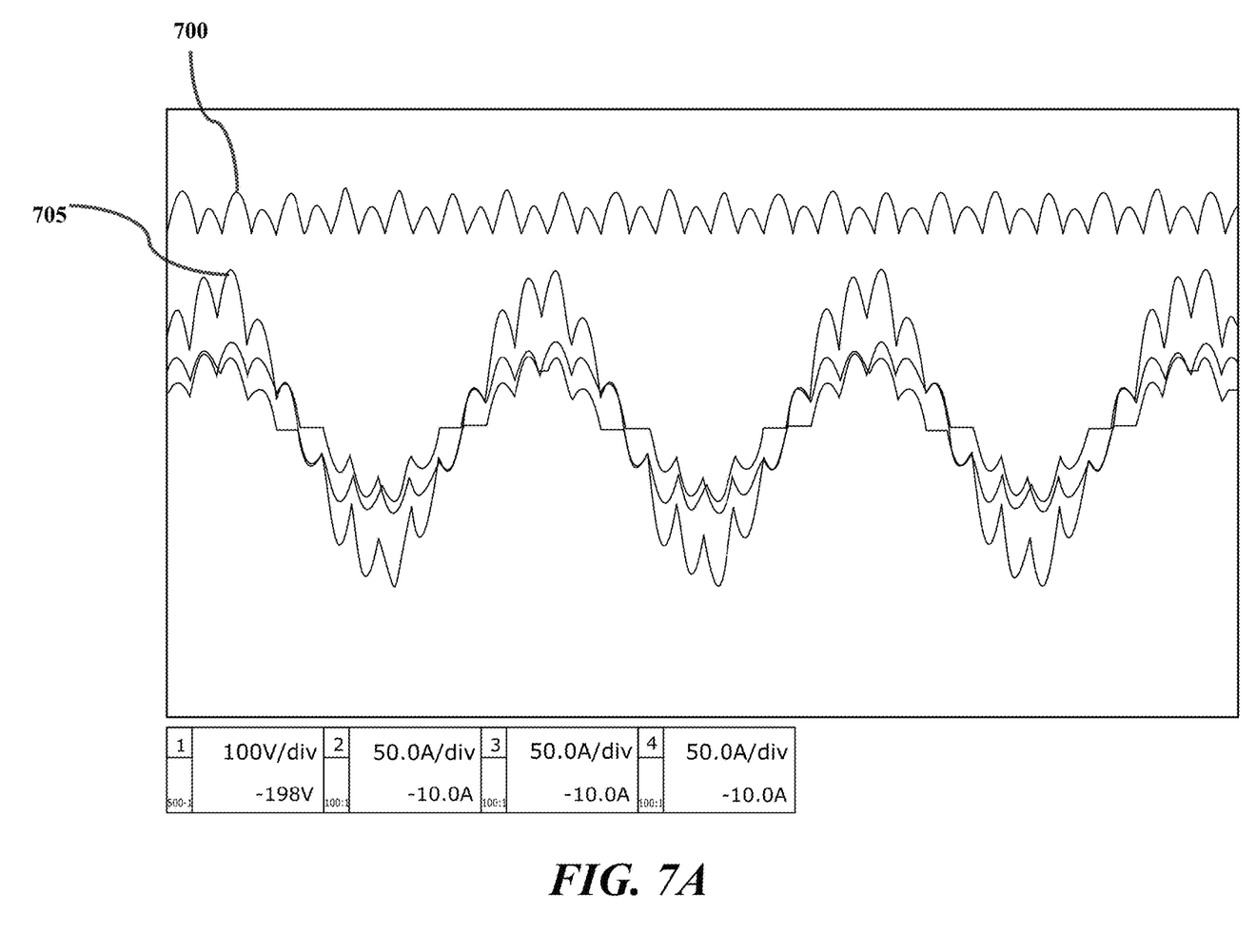
FIGS. 7A-7B depict a graphical representations of experimental results according to one or more embodiments.
Figure 7B:
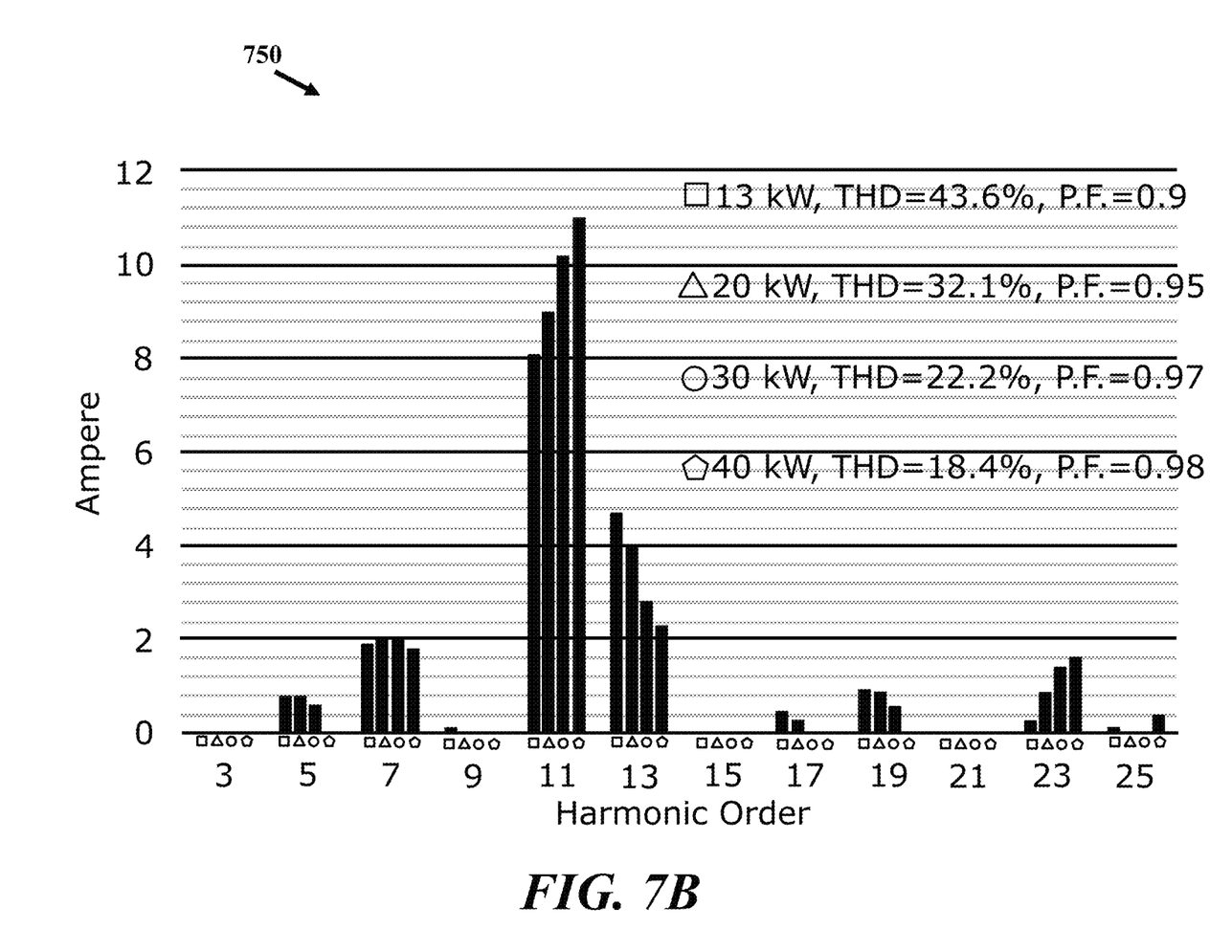

FIGS. 7A-7B depict a graphical representations of experimental results according to one or more embodiments. In one exemplary embodiment, FIGS. 7A-7C show experimental results of a 40 kW phase-shift autotransformer with three-phase 380V 50 Hz input. When $\alpha=\pi/12$, the magnitudes of the 11$^{th}$ and 13$^{th}$ components have the largest value among all harmonics.

Representations in FIGS. 7A-7B are based on modeling of a 12 pulse rectifier with autotransformer as discussed herein. Parameters modeled are shown in Table 1.

TABLE 1

| SIMULATION PARAMETERS | | |
|---|---|---|
| Parameter | Symbol | Value |
| Turn ratio | $N_P:N_1:N_2$ | 5:13:18 |
| RL load | R, L | 7.2Ω, 12 mH |
| Self-inductance | $L_P, L_1, L_2$ | 3.3, 1.8, 42 mH |
| DC capacitor | C | 220 uF |

In FIG. 7A, waveforms generated by a multi-pulse rectifier system as described herein (e.g., Multi-pulse rectifier system 300) can include DC output voltage 700 for phase A currents 705 at 40 kW. In FIG. 7A, DC output voltage $V_o$ 700 is portrayed on a graph with respect to and current $I_{A1}$ of the phase shift winding, current $I_{A2}$ of a phase shift winding and current $I_A$ of the primary winding. In the example of FIG. 7A, the DC output voltage ripple is about 10% and power factor of the AC input current is 0.98 at 40 kW. The total harmonic distortion (THD) is about 18.4% at 40 kW. The autotransformer of FIGS. 7A-7B utilized three sets of EI-110 silicon steel cores targeting 1.3 kW capacity for each phase. The capacity of autotransformers discussed herein may be at and/or below 10% of the rectifier output power.

FIG. 7B shows a harmonic spectrum 750 of the multi-pulse rectifier system with $\alpha=\pi/12$. FIG. 7B shows harmonic response to 13, 20, 30 and 40 kW multi-pulse rectifier systems as described herein.

Figure 8A:
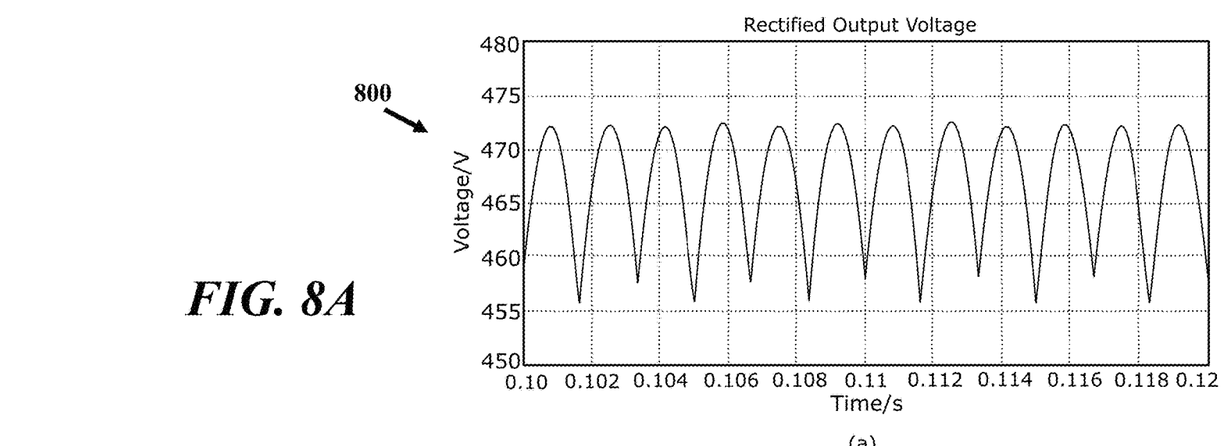
FIGS. 8A-8C depict a graphical representations of experimental results according to one or more embodiments.
Figure 8B:
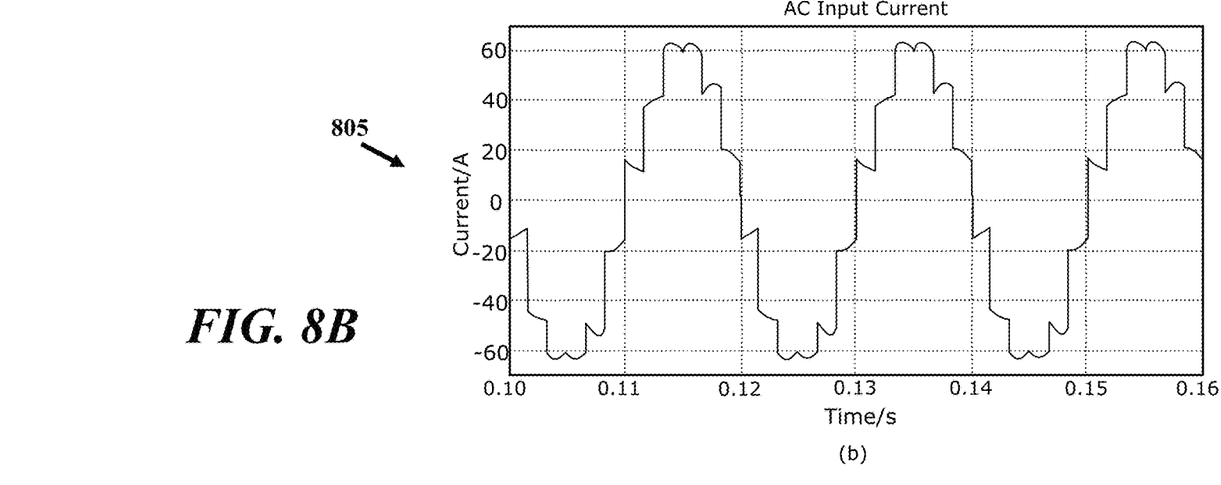
Figure 8C:
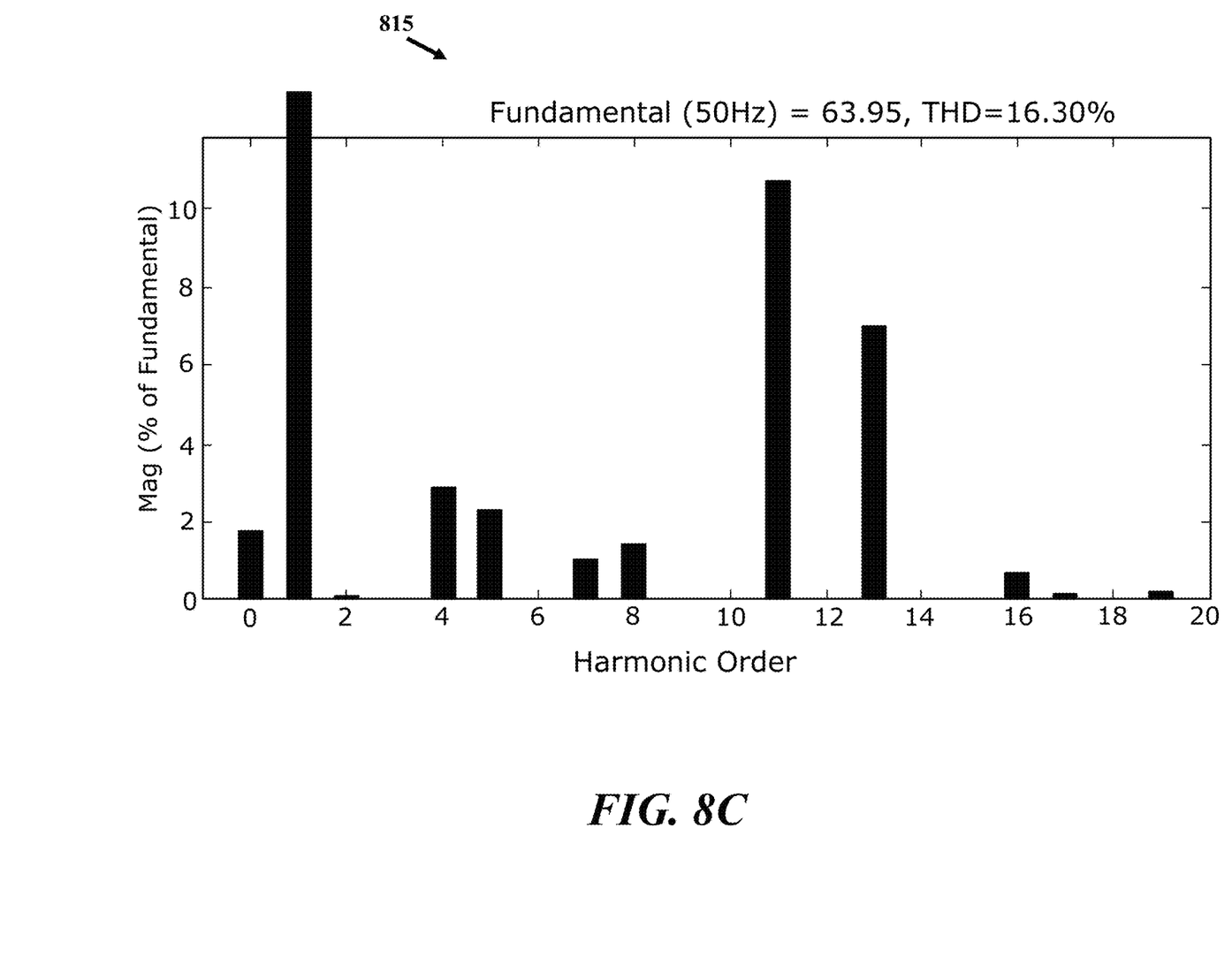

FIGS. 8A-8C depict a graphical representations of experimental results according to one or more embodiments. FIG. 8A shows a graphical representation of DC output voltage rectified output voltage DC output voltage 800. FIG. 8B shows AC input current 805 in phase A of the autotransformer. FIG. 8C shows a total harmonic distortion (THD) analysis 815.

Figure 9:
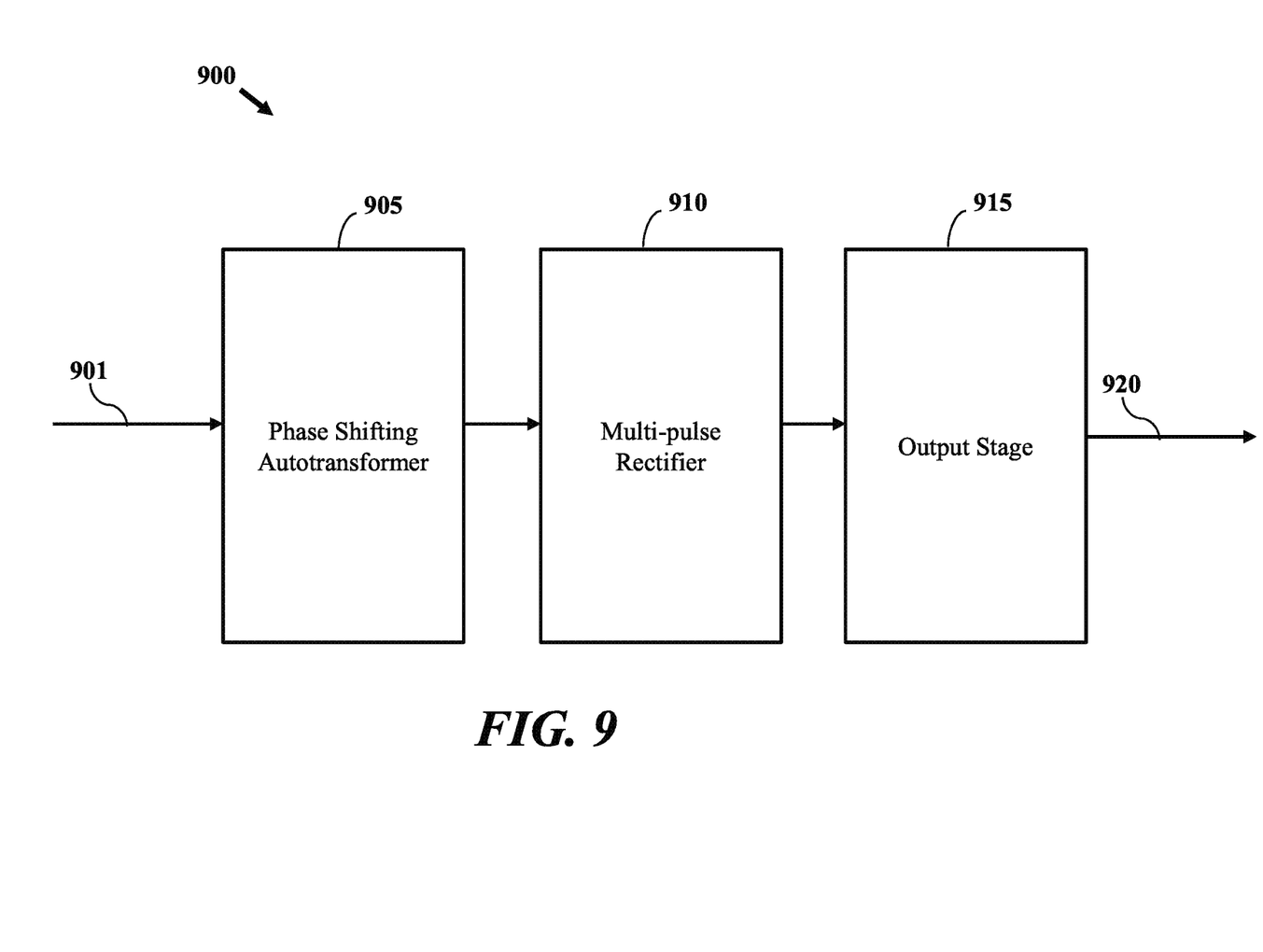
FIG. 9 depicts a graphical representation of a charge station according to one or more embodiments.

FIG. 9 depicts a graphical representation of a charge station according to one or more embodiments. According to another embodiment, vehicle charging stations may employ one or more components described herein, such as a phase-shift autotransformer and a multi-pulse rectifier system (e.g., multi-pulse rectifier system 300). According to one embodiment a charging station 900 can include an input 901 to receive AC supply voltage, a phase-shifting autotransformer 905, a multi-pulse rectifier 910, an output stage 915 and an output 920 including a charging connection. Input 901 may be configured to receive AC supply voltage from a source, such as a grid supply voltage. Phase-shifting autotransformer 905 may be relate to one or more configurations discussed herein to transform received supply power. Output stage 915 may include one or more of a rectifier (e.g., diode bridge rectifier 320) and filtering capacitor (e.g., filtering capacitor 325). Output 920 may relate to a charging connection, including a plug or terminal connection to a vehicle.

According to one embodiment a charging station 900 can be configured for utility interface applications for fast charging. DC fast charging for electric vehicle may require 200+kW power conversion from a supply, such as a grid power source to Electric Vehicle Supply Equipment (EVSE). The phase shifting reactor/transformer which provides line-frequency galvanic isolation in EVSE plays an essential role in assuring system stability and generating less harmonics that are detrimental to grid. According to one embodiment, charging station 900 includes a phase-shifting autotransformer is based on three-phase multi-pulse rectifier with passive power factor correction circuit for high power, rural-area DC charging application. Charging station 900 may be configured to achieve a total kVA rating of 9.38% of output power, which greatly reduces the volume and weight, and increases the manufacturability of autotransformer in the rectifier system in EVSE. The volume and weight of the rectifier configuration is reduced by the disclosed embodiments.

While this disclosure has been particularly shown and described with references to exemplary embodiments thereof, it will be understood by those skilled in the art that various changes in form and details may be made therein without departing from the scope of the claimed embodiments.

What is claimed is:

1. A phase-shift autotransformer comprising:
    a first magnetic core, a second magnetic core and a third magnetic core;
    a wiring configuration for the first, second and third magnetic cores, wherein the wiring configuration includes primary input and phase-shift windings;
    an input coupled to the wiring configuration, the input configured to receive AC input; and
    an output coupled to the wiring configuration, the output configured to provide six-phase voltage output,
    wherein the primary input windings of the wiring configuration and the first, second and third magnetic cores are configured to provide a first primary input inductance, a second primary input inductance, and a third primary input inductance,
    wherein the phase-shift windings of the wiring configuration and the first, second and third magnetic cores are configured to provide:
        a first and second inductance for phase-shift windings of the first magnetic core;
        a third and fourth inductance for phase-shift windings of the second magnetic core; and
        a fifth and sixth inductance for phase-shift windings of the third magnetic core, and
    wherein output of the first primary inductance is coupled to or between the third and fourth inductance for phase-shift windings of the second magnetic core, output of the second primary inductance is coupled to or between the fifth and sixth inductance for phase-shift windings of the third magnetic core, and output of the third primary inductance is coupled to or between the first and second inductance for phase-shift windings of the first magnetic core.

2. The phase-shift autotransformer of claim 1, wherein the first magnetic core, the second magnetic core and the third magnetic core include at least one of a five-column core and E-type core.

3. The phase-shift autotransformer of claim 1, wherein phase angle of AC input voltage and current at each phase is shifted by the first primary input inductance, the second primary input inductance, and the third primary input inductance of the primary input windings of the wiring configuration.

4. The phase-shift autotransformer of claim 1, wherein the phase-shift windings of the wiring configuration and the first, second and third magnetic cores are configured to provide two voltage components for each core.

5. The phase-shift autotransformer of claim 1, wherein the first magnetic core, the second magnetic core, the third magnetic core and the wiring configuration are configured to provide a capacity rating of about 10% of output power for a rectifier.

6. The phase-shift autotransformer of claim 1, wherein the output of the autotransformer is configured to output six-phase output to a multi-pulse rectifier.

7. The phase-shift autotransformer of claim 1, wherein the first magnetic core, the second magnetic core, the third magnetic core and the wiring configuration are configured to provide a total kVA rating of about 9% output power.

8. A multi-pulse rectifier system comprising:
    a phase-shift autotransformer including
        a first magnetic core, a second magnetic core and a third magnetic core;
        a wiring configuration for the first, second and third magnetic cores, wherein the wiring configuration includes primary input and phase-shift windings;
        an input coupled to the wiring configuration, the input configured to receive AC input; and
        an output coupled to the wiring configuration, the output configured to provide six-phase voltage output;
    a diode bridge rectifier configuration coupled to the output; and
    a filtering capacitor coupled to the diode bridge rectifier,
    wherein the primary input windings of the wiring configuration and the first, second and third magnetic cores are configured to provide a first primary input inductance, a second primary input inductance, and a third primary input inductance,
    wherein the phase-shift windings of the wiring configuration and the first, second and third magnetic cores are configured to provide:
        a first and second inductance for phase-shift windings of the first magnetic core;
        a third and fourth inductance for phase-shift windings of the second magnetic core; and
        a fifth and sixth inductance for phase-shift windings of the third magnetic core, and
    wherein output of the first primary inductance is coupled to or between the third and fourth inductance for phase-shift windings of the second magnetic core, output of the second primary inductance is coupled to or between the fifth and sixth inductance for phase-shift windings of the third magnetic core, and output of the third primary inductance is coupled to or between the first and second inductance for phase-shift windings of the first magnetic core.

9. The multi-pulse rectifier system of claim 8, wherein the first magnetic core, the second magnetic core and the third magnetic core include at least one of a five-column core and E-type core.

10. The multi-pulse rectifier system of claim 8, wherein a phase angle of AC input voltage and current at each phase is shifted by the first primary input inductance, the second primary input inductance, and the third primary input inductance of the primary input windings of the wiring configuration.

11. The multi-pulse rectifier system of claim 8, wherein the phase-shift windings of the wiring configuration and the first, second and third magnetic cores are configured to provide two voltage components for each core.

12. The multi-pulse rectifier system of claim 8, wherein the first magnetic core, the second magnetic core, the third magnetic core and the wiring configuration are configured to provide a capacity rating of about 10% of output power for a rectifier.

13. The multi-pulse rectifier system of claim 8, wherein the output of the autotransformer is configured to output six-phase output to a multi-pulse rectifier.

14. The multi-pulse rectifier system of claim 8, wherein the first magnetic core, the second magnetic core, the third magnetic core and the wiring configuration are configured to provide a total kVA rating of about 9% output power.

15. A charging station comprising:
   a charging connection; and
   a multi-pulse rectifier system coupled to the charging connection, the multi-pulse rectifier system including a phase-shift autotransformer, the phase-shift autotransformer including:
      a first magnetic core, a second magnetic core and a third magnetic core;
      a wiring configuration for the first, second and third magnetic cores, wherein the wiring configuration includes primary input and phase-shift windings;
      an input coupled to the wiring configuration, the input configured to receive AC input; and
      an output coupled to the wiring configuration, the output configured to provide six-phase voltage output; and
   a diode bridge rectifier configuration coupled to the output; and
   a filtering capacitor coupled to the diode bridge rectifier,
   wherein the primary input windings of the wiring configuration and the first, second and third magnetic cores are configured to provide a first primary input inductance, a second primary input inductance, and a third primary input inductance,
   wherein the phase-shift windings of the wiring configuration and the first, second and third magnetic cores are configured to provide:
      a first and second inductance for phase-shift windings of the first magnetic core;
      a third and fourth inductance for phase-shift windings of the second magnetic core; and
      a fifth and sixth inductance for phase-shift windings of the third magnetic core, and
   wherein output of the first primary inductance is coupled to or between the third and fourth inductance for phase-shift windings of the second magnetic core, output of the second primary inductance is coupled to or between the fifth and sixth inductance for phase-shift windings of the third magnetic core, and output of the third primary inductance is coupled to or between the first and second inductance for phase-shift windings of the first magnetic core.

16. The charging station of claim 15, wherein the first magnetic core, the second magnetic core, the third magnetic core and the wiring configuration are configured to provide a total kVA rating of about 9% output power.

\* \* \* \* \*